US010021002B2

(12) United States Patent
Keskin et al.

(10) Patent No.: US 10,021,002 B2
(45) Date of Patent: Jul. 10, 2018

(54) SENSOR DATA ACQUISITION IN A USER EQUIPMENT

(71) Applicant: QUALCOMM Incorporated, San Diego, CA (US)

(72) Inventors: Mustafa Keskin, San Diego, CA (US); Robert Gilmore, Poway, CA (US); Muhammed Sezan, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/192,777

(22) Filed: Jun. 24, 2016

(65) Prior Publication Data

US 2017/0373956 A1 Dec. 28, 2017

(51) Int. Cl.
*H04M 3/42* (2006.01)
*H04L 12/26* (2006.01)
*H04W 4/70* (2018.01)
*H04W 4/00* (2018.01)
(Continued)

(52) U.S. Cl.
CPC ............ *H04L 43/065* (2013.01); *H04L 43/16* (2013.01); *H04W 4/005* (2013.01); *H04W 4/70* (2018.02); *H04W 24/08* (2013.01); *H04W 52/0254* (2013.01); *H04W 52/0277* (2013.01); *H04M 2250/12* (2013.01); *H04W 52/028* (2013.01); *H04W 52/0251* (2013.01)

(58) Field of Classification Search
CPC ...... H04L 43/065; H04L 43/16; H04W 4/005; H04W 24/08
USPC ...................................................... 455/414.1
See application file for complete search history.

(56) References Cited

U.S. PATENT DOCUMENTS

2004/0055020 A1* 3/2004 Delpuch .................. H04N 5/76
725/134
2007/0065032 A1* 3/2007 Hernandez ........... H04N 19/115
382/239
2010/0099461 A1 4/2010 Rahfaldt et al.
(Continued)

FOREIGN PATENT DOCUMENTS

GB 2401752 A 11/2004
WO 2014140135 A1 9/2014

OTHER PUBLICATIONS

Partial International Search Report—PCT/US2017/034321—ISA/EPO—dated Aug. 21, 2017.
(Continued)

*Primary Examiner* — Charles Shedrick
(74) *Attorney, Agent, or Firm* — Arent Fox, LLP (57) ABSTRACT

The present application relates to acquiring sensor data at a user equipment (UE). The described aspects include receiving a first input representing a request to activate one or more sensors. The described aspects further include activating, by a controller at the UE, the one or more sensors in response to receiving the first input. Further, the described aspects include receiving the sensor data from each of the one or more sensors in response to activating the one or more sensors. The described aspects include determining whether a sensor adjustment condition has been satisfied. Additionally, the described aspects include adjusting an acquisition characteristic of the one or more sensors based on determining that the sensor adjustment condition has been satisfied.

58 Claims, 6 Drawing Sheets

(51) Int. Cl.
*H04W 24/08* (2009.01)
*H04W 52/02* (2009.01)

(56) References Cited

U.S. PATENT DOCUMENTS

| | | |
|---|---|---|
| 2010/0210301 A1 | 8/2010 | Dietz et al. |
| 2011/0092164 A1 | 4/2011 | Spanhake |
| 2011/0102591 A1 | 5/2011 | Yoon et al. |
| 2013/0070624 A1* | 3/2013 | Nguyen .................. H03M 7/30 370/252 |
| 2013/0302758 A1 | 11/2013 | Wright |
| 2014/0146170 A1 | 5/2014 | Tofighbakhsh |
| 2014/0198669 A1* | 7/2014 | Brown .................. H04L 43/024 370/250 |
| 2014/0269658 A1* | 9/2014 | Sadasivam ........ H04W 72/0406 370/338 |
| 2015/0017965 A1 | 1/2015 | Lim et al. |
| 2016/0077606 A1* | 3/2016 | Hyun ........................ G06F 3/14 345/156 |
| 2016/0165037 A1 | 6/2016 | Youn et al. |

OTHER PUBLICATIONS

International Search Report and Written Opinion—PCT/US2017/034321—ISA/EPO—dated Oct. 19, 2017.

* cited by examiner

SENSOR DATA ACQUISITION IN A USER EQUIPMENT

BACKGROUND

The present disclosure relates generally to communication systems, and more particularly, to acquiring sensor data at a user equipment (UE).

Wireless communication systems are widely deployed to provide various telecommunication services such as telephony, video, data, messaging, and broadcasts. Use of communication devices within such systems has dramatically increased. Communication devices often provide access to a network, such as a Local Area Network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., Wireless Fidelity or "Wi-Fi") standards. Communication device users, for example, often connect to wireless communication networks using such communication devices.

As the use of communication devices has increased, advancements in communication device capacity, reliability and efficiency are being sought. In particular, communication devices typically include a number of onboard sensors configured to capture a wide range of information. However, use or activation of such sensors may be limited during certain scenarios which may otherwise benefit from a capture of sensor data. As such, use or activation of such sensors may be beneficial during such scenarios. Accordingly, systems and methods that improve communication device usability and/or efficiency may be beneficial.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method relates to acquiring sensor data at a user equipment (UE). The described aspects include receiving a first input representing a request to activate one or more sensors. The described aspects further include activating, by a controller at the UE, the one or more sensors in response to receiving the first input. The described aspects further include receiving the sensor data from each of the one or more sensors in response to activating the one or more sensors. The described aspects further include determining whether a sensor adjustment condition has been satisfied. The described aspects further include adjusting an acquisition characteristic of the one or more sensors based on determining that the sensor adjustment condition has been satisfied.

In accordance with an aspect, an apparatus relates to acquiring sensor data. The described aspects include means for receiving a first input representing a request to activate one or more sensors. The described aspects further include means for activating, by a controller at a user equipment (UE), the one or more sensors in response to receiving the first input. The described aspects further include means for receiving the sensor data from each of the one or more sensors in response to activating the one or more sensors. The described aspects further include means for determining whether a sensor adjustment condition has been satisfied. The described aspects further include means for adjusting an acquisition characteristic of the one or more sensors based on determining that the sensor adjustment condition has been satisfied.

In accordance with an aspect, a computer-readable medium storing computer executable code relates to sensor data acquisition. The described aspects include code for receiving a first input representing a request to activate one or more sensors. The described aspects further include code for activating, by a controller at a user equipment (UE), the one or more sensors in response to receiving the first input. The described aspects further include code for receiving the sensor data from each of the one or more sensors in response to activating the one or more sensors. The described aspects further include code for determining whether a sensor adjustment condition has been satisfied. The described aspects further include code for adjusting an acquisition characteristic of the one or more sensors based on determining that the sensor adjustment condition has been satisfied.

In accordance with an aspect, an apparatus comprising a memory and at least one processor coupled to the memory relates to sensor data acquisition. The at least one processor is configured to receive a first input representing a request to activate one or more sensors. The at least one processor is further configured to activate, by a controller at a user equipment (UE), the one or more sensors in response to receiving the first input. The at least one processor is further configured to receive the sensor data from each of the one or more sensors in response to activating the one or more sensors. The at least one processor is further configured to determine whether a sensor adjustment condition has been satisfied. The at least one processor is further configured to adjust an acquisition characteristic of the one or more sensors based on determining that the sensor adjustment condition has been satisfied.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, various structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station," a "smart phone," a "tablet" and variations thereof.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The continued development of UEs has provided increased features and functionalities within such devices. Specifically, a UE may include various sensors for capturing, detecting, and/or tracking various aspects of the UE (e.g., mobile device), or of a user of the UE. For example, a UE may include an accelerometer to measure the acceleration of the UE (and in turn of the user). Further, the UE may include a global positioning system (GPS) component to capture and/or track a location of the UE. Although many of the sensors within the UE may be used by, or in some instances, are primarily intended for one or more applications, the sensors may nonetheless be utilized in or during other scenarios (irrespective of an activation of an application). Specifically, utilizing some or all sensors during the course of various events, such as, but not limited to, emergency events may be desirable. Further, being able to easily enable the device to function as a black box recorder may be desirable in certain scenarios.

The present aspects generally relate to enhanced data acquisition and communication in a UE. As noted above, a UE may include numerous sensors that capture, detect and/or measure one or more physical properties. Individual sensors or a subset of a set of all sensors of the UE may be activated at various points in time based on a corresponding activation of an application, for example. Nonetheless, in some instances, a user of the UE may desire to promptly utilize or activate one or more of the onboard UE sensors. In some aspects, the UE may also utilize one or more wearable sensors, car sensors, and/or home sensors that are in proximity to the UE. For instance, a user of a UE may experience or encounter a scenario where the utilization or activation of one or more of the sensors onboard or within the UE would be beneficial. In some aspects, the scenario may be an emergency scenario during which the capturing and/or recording of sensor data from one or more of the sensors in proximity to the UE may be beneficial. Further, for example, the UE may be configured to activate certain wearable sensors in a medical emergency or certain car sensors in a traffic emergency (in addition to the onboard UE sensors). As such, activation and/or utilization of the one or more sensors may enable the UE to capture and/or record information regarding the immediate surroundings of the UE (and the user). Accordingly, the UE may operate as a "black box" that captures and/or records data concurrently received from the activated sensors.

Figure 1:
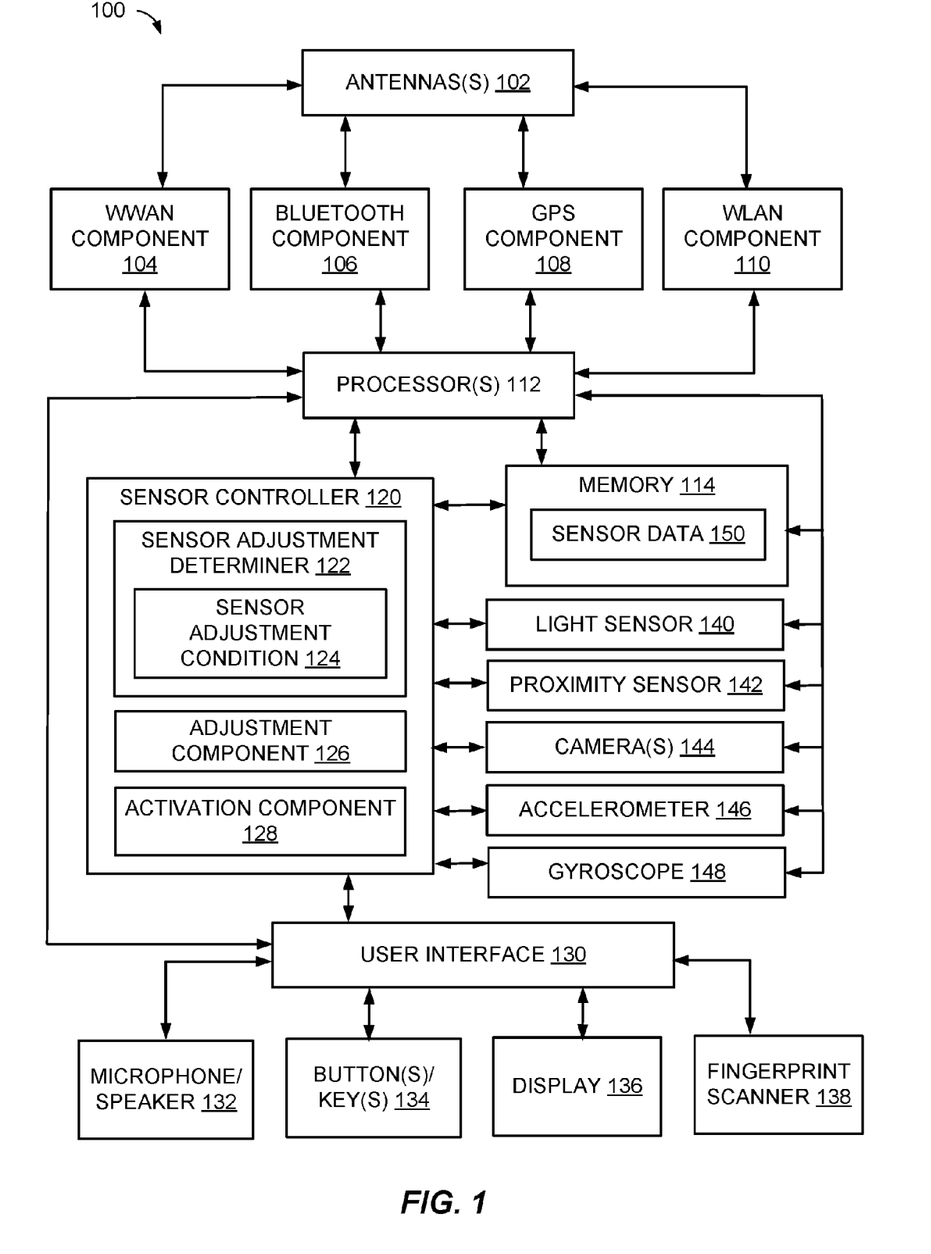
FIG. 1 is an example UE that may be used in an operating environment that can acquire and/or communicate sensor data in accordance with an aspect of the present disclosure.

FIG. 1 is a block diagram illustrating various components of an UE 100. For the sake of simplicity, the various features and functions illustrated in the diagram of FIG. 1 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 1 may be further subdivided or two or more of the features or functions illustrated in FIG. 1 may be combined.

The UE 100 may include a WWAN component 104 that may be coupled to one or more antennas 102. The WWAN component 104 may include suitable devices, hardware, and/or software for communicating with and/or detecting signals to/from a network entity such as an access point and/or base station, and/or directly with other wireless devices (e.g., other UEs) within a communication network. In an aspect, the WWAN component 104 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (802.16), TDNM, OFDM, GPRS, EV-DO, S02.xx, UWB, and/or LTE.

The UE 100 may also include a WLAN component 110 that may be connected to one or more antennas 102. The WLAN component 110 may include suitable devices, hardware, and/or software for communicating with and/or detecting signals to/from a network entity such as an access point, and/or directly with other wireless devices (e.g., UEs) within a communication network. In an aspect, the WLAN component 110 may include a Wi-Fi (e.g., IEEE 802.11a/ac/b/g/h/n, IEEE 802.16, and/or IEEE 802.20) communication system suitable for communicating with one or more wireless access points; however in other aspects, the WLAN component 110 may include another type of local area network, e.g., a personal area network.

In some aspects, the UE 100 may include a GPS component 108 that may be connected to one or more antennas 102. The GPS component 108 may include suitable devices, hardware, and/or software for receiving and processing satellite signals. Further, the UE 100 may include a Bluetooth component 106 that may be connected to one or more antennas 102 for receiving/transmitting signals according to IEEE 802.15. The Bluetooth component 106 may include suitable devices, hardware, and/or software for receiving and processing Bluetooth signals. Additionally, any other type of wireless networking technologies may be used, for example, ZigBee.

Further, in some aspects, the UE 100 may include one or more sensors configured to detect, determine, or otherwise acquire information related to one or more physical properties. For example, the UE 100 may include a light sensor 140 that may be connected to one or more components of the UE 100 such as, but not limited to, the processor 112 and/or the memory 114. Additionally, the UE 100 may include proximity sensor 142 that may be connected to one or more components of the UE 100 such as, but not limited to, the processor 112 and/or the memory 114. In addition, the UE 100 may include one or more cameras 144 that may be connected to one or more components of the UE 100 such as, but not limited to, the processor 112 and/or the memory 114. Further, the UE 100 may include an accelerometer 146 that may be connected to one or more components of the UE 100 such as, but not limited to, the processor 112 and/or the memory 114. Moreover, the UE 100 may include a gyroscope 148 that may be connected to one or more components of the UE 100 such as, but not limited to, the processor 112 and/or the memory 114. In some aspects, although not illustrated, the UE 100 may also include a magnetometer, a pressure sensor (e.g., barometer), a temperature sensor (e.g., digital thermometer), and/or a humidity sensor. Additionally, a microphone/speaker 132 may be or otherwise act as a voice sensor. In some aspects, the one or more sensors may be or otherwise include one or more wearable sensors such as, but not limited to, a heart rate sensor, a blood pressure sensor, a wearable camera. Further, in some aspects, the one or more sensors may be or otherwise include one or more car sensors such as an impact sensor.

The UE 100 may also include a processor 112. The processor 112 may be connected to the WWAN component 104, the Bluetooth component 106, the GPS component 108, and the WLAN component 110. The processor 112 may include one or more microprocessors, microcontrollers, and/or digital signal processors that provide processing functions, as well as other calculation and control functionality. The processor 112 may communicate, or in some non-limiting aspects include a memory 114 for storing data and software instructions for executing programmed functionality within the UE 100. In some aspects, the memory 114 may be on-board the processor 112 (e.g., within the same IC package), and/or the memory 114 may be external memory that is functionally coupled to the processor 112 over a data bus.

In some aspects, the memory 114 may include any type of computer-readable medium usable by a computer or the processor 112, such as random access memory (RAM), read only memory (ROM), tapes, magnetic discs, optical discs, volatile memory, non-volatile memory, and any combination thereof. In an aspect, for example, the memory 114 may be a computer-readable storage medium (e.g., a non-transitory medium) that stores computer-executable code. The computer-executable code may define one or more operations or functions of the sensor controller 120 and/or one or more of the subcomponents, and/or data associated therewith. Further, each of the WWAN component 104, the Bluetooth component 106, the GPS component 108, the WLAN component 110, the light sensor 140, the proximity sensor, the one or more cameras 144, the accelerometer 146, and/or the gyroscope 148 may include hardware, firmware, and/or software and may be configured to execute code or perform instructions stored in a memory (e.g., a computer-readable storage medium).

A number of software modules and/or applications may reside in the memory 114 and be utilized by the processor 112 and/or other components of the UE 100 in order to manage communications and/or services. Although not illustrated, the memory 114 may include a number of applications. The organization of the memory contents as shown in FIG. 1 is for purposes of illustration and not limitation, and as such the functionality of the modules and/or data structure may be combined, separated, and/or be structured in different ways depending upon the implementation of the UE 100.

Further, the processor 112 may include any form of logic suitable for performing at least the techniques provided herein. For example, the processor 112 may be operatively configurable based on instructions in the memory 114 to selectively initiate one or more routines and/or applications.

The UE 100 may include a user interface 130 which may be configured to provide any suitable interface systems, such as a microphone/speaker 132, a buttons/keys 134, a display 136, and/or a fingerprint sensor 138 that allows user interaction with the UE 100. The microphone/speaker 132 may be configured to provide for voice communication services using one or more of the WWAN component 104, the Bluetooth component 106, and/or the WLAN component 110. The buttons/keys 134 may include any suitable buttons for user input, which may also include other external hardware inputs of the UE 100. In some aspects, the buttons/keys may be in the form of a keypad. The display 136 may include any suitable display, such as, for example, a backlit LCD display, and may further include a touch screen display for additional user input modes. Additionally, the fingerprint sensor 138 may include any suitable fingerprint sensor such as, for example, a capacitive fingerprint reader.

The UE 100 may also include the sensor controller 120, which may be configured to manage and/or control the acquisition of sensor information from one or more sensors based on an input received from the user interface 130. Specifically, in some aspects, a user of the UE 100 may desire to readily and quickly acquire information from or using one or more sensors in various scenarios. For example, in an emergency scenario, the user of the UE 100 may be unable or not have enough time to manually or individually activate each of the one or more sensors desired for acquiring surrounding information. As such, the sensor controller 120 may be configured to concurrently activate one or more sensors based on an input received from the user interface 130.

In some aspects, the one or more sensors may include a light sensor 140, a proximity sensor 142, one or more cameras 144, an accelerometer 146, a gyroscope 148, the WWAN component 104, the Bluetooth component 106, the GPS component 108, the WLAN component 110, and although not illustrated, a magnetometer, a pressure sensor, a temperature sensor, and/or a humidity sensor.

In some aspects, the sensor controller 120 may be configured to associate a defined number or specific types of sensors to an input type. That is, the sensor controller 120 may be configured (e.g., by the user using user interface 130) to assign or associate a set or subset of sensors with an input type. Upon receiving an indication of an input type, the sensor controller 120 may be configured to then determine the input type and correspondingly activate at least one the sensor associated with the input type. In some aspects, the input type may include, but is not limited to, any combination of hardware buttons/keys 134, a touch pattern detected on the display 136, a voice detection by the microphone/speaker 132 (e.g., recognition of certain phrases or words spoken by the user), and/or a fingerprint detected by the fingerprint sensor 138.

As such, each input type may, upon detection of that input type, trigger activation of one or more sensors associated with the input type. In some aspects, voice activation may include triggering a recording of audio by the microphone/speaker 132 to, for example, detect/acquire a voice of a user. For example while the microphone/speaker 132 is recording or acquiring sound, the sensor controller 120 may receive detected voice information. In some aspects, the voice activation may include a spoken word or spoken command (e.g., "activate sensors" and/or "Help"). In a further example, activation of the one or more selected sensors may be triggered by a selection of one or more hardware buttons/keys 134. In some aspects, the sensor controller 120 may receive a selection of a concurrent or simultaneous selection of the one or more hardware buttons/keys 134. For example, the sensor controller 120 may detect a concurrent selection (or pressing) of two or more buttons of buttons/keys 134 for a defined time period, e.g., the concurrent selection of a power key and a volume key for two seconds. In some aspects, the sensor controller 120 may be configured to determine whether the concurrent triggering/selection of the two or more buttons satisfies (e.g., meets or exceeds) the defined time period, which if so, may trigger activation of the one or more sensors associated with the input type indicated by the concurrent selection of the two or more buttons.

In some aspects, the sensor controller 120 may receive a successive or sequential selection of the one or more hardware buttons/keys 134. Further, the sensor controller 120 may be configured to activate the one or more selected sensors based on receiving a fingerprint scan/data. Specifically, the one or more selected sensors may be activated by the sensor controller 120 based on a specific user fingerprint scan acquired by the fingerprint sensor 138. In some aspects, different fingerprints of the same user may be associated with a different selected sensor. That is, for example, a first fingerprint scan (e.g., the right index finger) of a first user may be associated with one or more first selected sensors, and a second fingerprint scan (e.g., the right thumb) of a first user (or a second user, e.g., the right index finger) may be associated with one or more second selected sensors.

For instance, the UE 100 may present, on the display 136, a set of sensor identifiers (e.g., sensor names) each associated with a distinct or different sensor from the one or more sensors for selection by the user. Accordingly, the sensor controller 120 may receive or detect an input, via the user interface 130, representing a selection of at least one sensor identifier from the set of sensor identifiers. Additionally, the input may also include a selection of the input type. Upon receiving an indication of both the input type and the at least one selected sensor identifier, the sensor controller 120 may associate or assign the sensor associated with the selected sensor identifier with selected the input type.

In an example, the sensor controller 120 may receive an input representing a selection of a first identifier associated with the light sensor 140 and a second identifier associated with the proximity sensor 142, along with a selection of voice activation using the microphone/speaker 132 as the input type. The sensor controller 120 may be configured to associate the light sensor 140 and the proximity sensor 142 with the voice activation input type (and may also store the association in the memory 114). In another example, the sensor controller 120 may be configured to receive an input representing a selection of a third identifier associated with the one or more cameras 144, a fourth identifier associated with the accelerometer 146, and a fifth identifier associated with the gyroscope 148. In addition or as part of the same input, the sensor controller 120 may receive a selection of a hardware button pattern (e.g., one or more buttons/keys 134) as the input type. The sensor controller 120 may be configured to associate the one or more cameras 144, the accelerometer 146, and the gyroscope 148 with the hardware button pattern input type.

The sensor controller 120 may be configured to activate, via the activation component 128, one or more sensors in response to detecting or otherwise determining an input type. For example, the sensor controller 120, via the user interface 130, may receive and/or detect an input representing an activation of the sensors. For example, the sensor controller 120 may receive or otherwise detect a voice activation via the microphone/speaker 132, a selection of one or more buttons/keys 134 (e.g., via a keypad), a touch pattern via the display 136, and/or a fingerprint scan via the fingerprint sensor 138.

Further, upon receiving the input representing an activation of the one or more sensors, the sensor controller 120 may be configured to determine which of the one or more sensors are to be activated based on the input. That is, the sensor controller 120 may determine an input type based on the received input. For example, in some aspects, the sensor controller 120 may be configured to determine whether the input corresponds to a first input type or a second input type. In some aspects, the first input type and/or the second input type may correspond to a voice activation via the microphone/speaker 132, a selection of one or more buttons/keys 134, a touch pattern on display 136, and/or a fingerprint scan using the fingerprint sensor 138 is detected and/or received.

The sensor controller 120 may be configured to then activate, via activation component 128, the one or more selected sensors associated with a particular input type. For example, in accordance with a determination that the input corresponds to the first input type (e.g., voice activation), the sensor controller 120 may be configured to activate a first set of one or more sensors (e.g., the light sensor 140, the proximity sensor 142, and/or one or more cameras 144). Further, for instance, in accordance with a determination that the input corresponds to a second input type (e.g., fingerprint scan), the sensor controller 120 may be configured to activate a second set of one or more sensors which may be different from the first set of one or more sensors (e.g., one or more cameras 144 and/or the accelerometer 146). In some aspects, the sensor controller 120 may, as part of activating the one or more sensors associated with the input type, enable one or more circuits from a set of circuits used to acquire data from each of the one or more activated sensors.

The sensor controller 120 may, in response to the activation of the one or more selected sensors, be configured to receive the sensor data from each of the one or more sensors. For example, the sensor controller 120 may receive data from the one or more activated sensors and transfer the sensor data 150 to the memory 114. The sensor data 150 may include data from each of the activated one or more selected sensors. In some aspects, each of the activated one or more selected sensors may provide to the sensor controller 120 corresponding sensor data at an interval specific to the sensor. For instance, the sensor controller 120 may receive data from a first sensor such as the light sensor 140 according a first time interval/data rate and may receive data from a second sensor such as the gyroscope 148 at a second time interval/data rate.

In some aspects, the sensor controller 120 may receive and convert analog sensor data to digital data. For example, the sensor controller 120 may be configured to receive analog sensor data from an activated sensor. The sensor controller 120 may be configured to then convert the analog data received from that sensor to digital sensor data. Alternatively, the sensor data from an activated sensor may be output as digital data. Further, the sensor controller 120 may be configured to transfer to the memory 114 the digital sensor data corresponding to each of the activated one or more selected sensors, wherein the transferring occurs periodically based on a defined time interval. In some aspects, the data for all sensors may be transferred on the same or different periodicity or time interval. In some aspects, the time interval or periodicity at which data is transferred for each sensor may be dependent upon a particular sensor type.

As the sensor controller 120 receives the sensor data 150 from the activated one or more selected sensors, the sensor controller 120 may be configured to determine, via sensor adjustment determiner 122, whether a sensor adjustment condition 124 has been satisfied. That is, in some aspects, while the UE 100 receives the sensor data 150, the sensor controller 120 may adjust the acquisition of the sensor data 150 based on determining whether the sensor adjustment condition 124 has been satisfied. In some aspects, the sensor adjustment condition 124 represents or otherwise corresponds to an event triggering an adjustment of at least one of the activated one or more selected sensors. As such, the sensor controller 120 may, via the sensor adjustment determiner 122, adjust an acquisition characteristic of the activated one or more selected sensors based on determining that the sensor adjustment condition 124 has been satisfied.

In some aspects, the sensor controller 120 may, via the sensor adjustment determiner 122, monitor a power supply (e.g., remaining battery charge level) of the UE 100 as part of determining whether the sensor adjustment condition 124 has been satisfied. For instance, sensor adjustment determiner 122 may be configured to determine that a power supply (e.g., battery charge level) of the UE 100 satisfies (e.g., meets or falls below) a power supply threshold (e.g., remaining battery charge level threshold). That is, sensor adjustment determiner 122 may monitor the power supply of the UE 100 to ensure efficient power consumption in the event of a low power supply (e.g., as determined by the battery charge level meeting or falling below the battery charge level threshold).

In some aspects, to conserve the UE's 100 power supply, the sensor adjustment determiner 122 may be configured to adjust an output bit depth of an analog-to-digital converter based on determining that the power supply of the UE 100 satisfies (e.g., meets or falls below) the power supply threshold. In some aspects, the output bit depth may be a number of bits of information in each sample, which may directly correspond to a resolution of each sample. In other words, the sensor adjustment determiner 122 may be configured to adjust a resolution of at least one of the activated one or more selected sensors. Further, in some aspects, to maintain efficient power consumption at the UE 100, the sensor adjustment determiner 122 may be configured to deactivate at least a subset of the activated one or more selected sensors based on determining that the power supply of the UE satisfies (e.g., meets or falls below) the power supply threshold. For example, the subset may represent or otherwise include at least one sensor having a highest power consumption from the activated one or more selected sensors. In some aspects, the sensor adjustment determiner 122 may be configured to adjust a clock frequency of at least one of the activated one or more selected sensors. For example, Table (1) below outlines example clock rates for various sensors.

TABLE (1)

Example clock rates for various sensors

| Sensor | Minimum | Typical | Maximum |
|---|---|---|---|
| Light Sensor 140 & Proximity Sensor 142 | 390 kHz | 780 kHz | 3.125 MHz |
| Accelerometer 146 | | 2 MHz | 4 MHz |
| Pressure | | 2 MHz | 4 MHz |
| Gyroscope 148 | 100 kHz | | 2 MHz |
| Microphone/Speaker 132 | 1 MHz | 2.4 MHz | 3.25 MHz |
| Camera(s) 144 | | 10 MHz | |

Additionally, in some aspects, as the sensor controller 120 receives and sends the sensor data 150 to the memory 114, the memory 114 may, after a period of time, reach a low memory state. As such, to make efficient use of the limited storage space of the memory 114, the sensor adjustment determiner 122, as part of determining whether the sensor adjustment condition 124 has been satisfied, may be configured to determine that a storage capacity level of the memory 114 satisfies (e.g., meets or exceeds) a storage capacity threshold. In other words, the sensor adjustment determiner 122 may determine that the memory 114 is in a low memory state. In some aspects, the amount of memory used for capturing sensor data may be configurable by the user or may be preconfigured. In some aspects, the storage capacity threshold may be a percentage of a maximum amount of memory for data capture (e.g., 80%), or may be based on a remaining recording time given a rate of data capture (e.g., 5 minutes).

Accordingly, as part of adjusting the acquisition characteristic of the activated one or more selected sensors, the sensor adjustment determiner 122 may be configured to adjust at least one of a data recording or acquisition interval, a signal sampling rate, an image capture rate, and/or a data compression rate based on determining that the storage capacity level of the memory 114 satisfies (e.g., meets or exceeds) the storage capacity threshold. For example, the recording/acquisition interval may represent or otherwise correspond to a period time between sensor recordings/acquisitions stored in the memory 114. As such, an adjustment of the recording/acquisition interval of a sensor may result in an increase in the recording/acquisition interval to correspondingly decrease the frequency of sensor recordings/acquisitions at the memory 114.

Further, for instance, the sampling rate may represent or otherwise be a number of samples of audio carried per second. Accordingly, a signal sampling rate may be decreased to correspondingly decrease the number of samples of audio per defined period of time. Additionally, for example, the data compression rate may represent or otherwise be a rate or ratio at which a data size may be reduced from an original size to a reduced size. In some aspects, the sensor adjustment determiner 122 may be configured to store the sensor data 150 at an address location of existing data. That is, the sensor adjustment determiner 122 may effectively overwrite old sensor data with new sensor data (e.g., when the memory 114 allocated for data storage is full, data recording starts overwriting the oldest data first such that the memory 114 contains the most recent data captured).

In some aspects, the UE 100 may, via the sensor controller 120, communicate (e.g., stream) acquired sensor data 150 wirelessly to a remote device or entity for secure storage and/or for real-time consumption. For example, during acquisition of the sensor data 150, the UE 100, via the sensor controller 120, may effectively stream the sensor data 150 to a remote device or entity via one or more wireless communication channels according to a radio access technology (RAT) or multi-RAT scheme. In some aspects, the sensor controller 120 may enable concurrent local storage of the sensor data 150 as well as communication of the sensor data 150 to a remote device or entity.

Additionally, deactivation or adjustment of the one or more sensors during data acquisition and wireless communication to a remote device or entity may be based on one or more channel conditions of the one or more wireless communication channels on which the sensor data 150 is transmitted. In particular, the sensor controller 120 may, via the sensor adjustment determiner 122, monitor one or more wireless communication channels (e.g., high speed uplink/downlink channels) between the UE 100 and a base station (e.g., evolved NodeB) on which the UE 100 is camped on to determine whether the one or more channel conditions satisfy (e.g., meet or fall below) a channel communication threshold.

For example, in an aspect, the sensor controller 120 may detect or otherwise determine that channel conditions of at least one wireless communication channel on which the sensor data 150 is being transmitted have deteriorated at or below the channel communication threshold. As a result, such deterioration in channel conditions may result in a transmission of a portion of the sensor data 150 (e.g., indicative of missing packets). Accordingly, the sensor controller 120 may, via the adjustment component 126, adjust one or more communication/transmission characteristics to ensure sensor data 150 is transmitted according to an adequate communication quality level.

For example, in some aspects, the sensor controller 120 may, via the adjustment component 126, determine whether one or more additional communication channels are available and communicate the sensor data 150 based on determining that such additional channels are available and that the one or more channel conditions satisfy a corresponding channel communication threshold. In some aspects, the sensor controller 120 may, via the adjustment component 126, adjust (e.g., lower) a communication rate (e.g., modulation rate) and/or initiate reselection to another base station or cell based on determining that such additional channels are available and that the one or more channel conditions satisfy a corresponding channel communication threshold. In some aspects, the sensor controller 120 may, via the adjustment component 126, adjust (e.g., lower) the acquisition and/or sampling rate of sensor data in response to varying (e.g., deteriorating) channel conditions.

In some aspects, the channel conditions may include, but are not limited to, a number of NACKs (e.g., indicative of a high number of missing packets detected at the receiving device or entity), a signal-to-noise ratio, a received signal strength indicator (RSSI), and/or a channel quality indicator (CQI). For example, with respect to the detection of the number of NACKs, the UE 100, and in particular, the sensor controller 120, may determine that the number of NACKs received in response to the transmission of the sensor data 150 on one or more wireless communication channels meets or exceeds a NACK threshold indicative of poor channel conditions, and thereby triggering adjustment component 126 to adjust a transmission characteristic based on the determination. In some aspects, sensor adjustment condition 124 may include or otherwise be referred to as streaming adjustment condition.

Further, in some aspects, the one or more selected sensors may be adjusted in response to receiving an input via user interface 130. For example, as part of determining whether the sensor adjustment condition 124 has been satisfied, the sensor adjustment determiner 122 may be configured receive an input representing a deactivation of the one or more selected sensors. For example, the input (e.g., first input type) may be the same input (e.g., first input type) detected as part of activating the one or more selected sensors. In some aspects, the input (e.g., second input type) may be different from the input (e.g., first input type) detected as part of activating the one or more selected sensors.

As used herein, the UE 100 may be any portable or movable device that is configurable to acquire wireless signals transmitted from, and transmit wireless signals to, one or more wireless communication devices or networks. As shown in FIG. 1, the UE 100 may be representative of such a portable wireless device. Thus, by way of example but not limitation, the UE 100 may include a radio device, a cellular telephone device, a computing device, a personal communication system (PCS) device, or other like movable wireless communication equipped device, appliance, or machine. The term "user equipment" is intended to include all devices, including wireless devices, computers, laptops, etc. which are capable of communication with a server, such as via the Internet, Wi-Fi, or other network. The term "user equipment" is also intended to include devices which communicate with a personal navigation device, such as by short-range wireless, infrared, wire line connection, or other connection. Any operable combination of the above is also considered a "user equipment." Further, as used herein, the terms "wireless device," "mobile station," "mobile device," "user equipment," etc. may refer to any type of wireless communication device which may transfer information over a network. The wireless device may be any cellular mobile terminal, personal communication system device, personal navigation device, laptop, personal digital assistant, smart phone, tablet, or any other suitable device capable of receiving and processing network signals.

Figure 2:
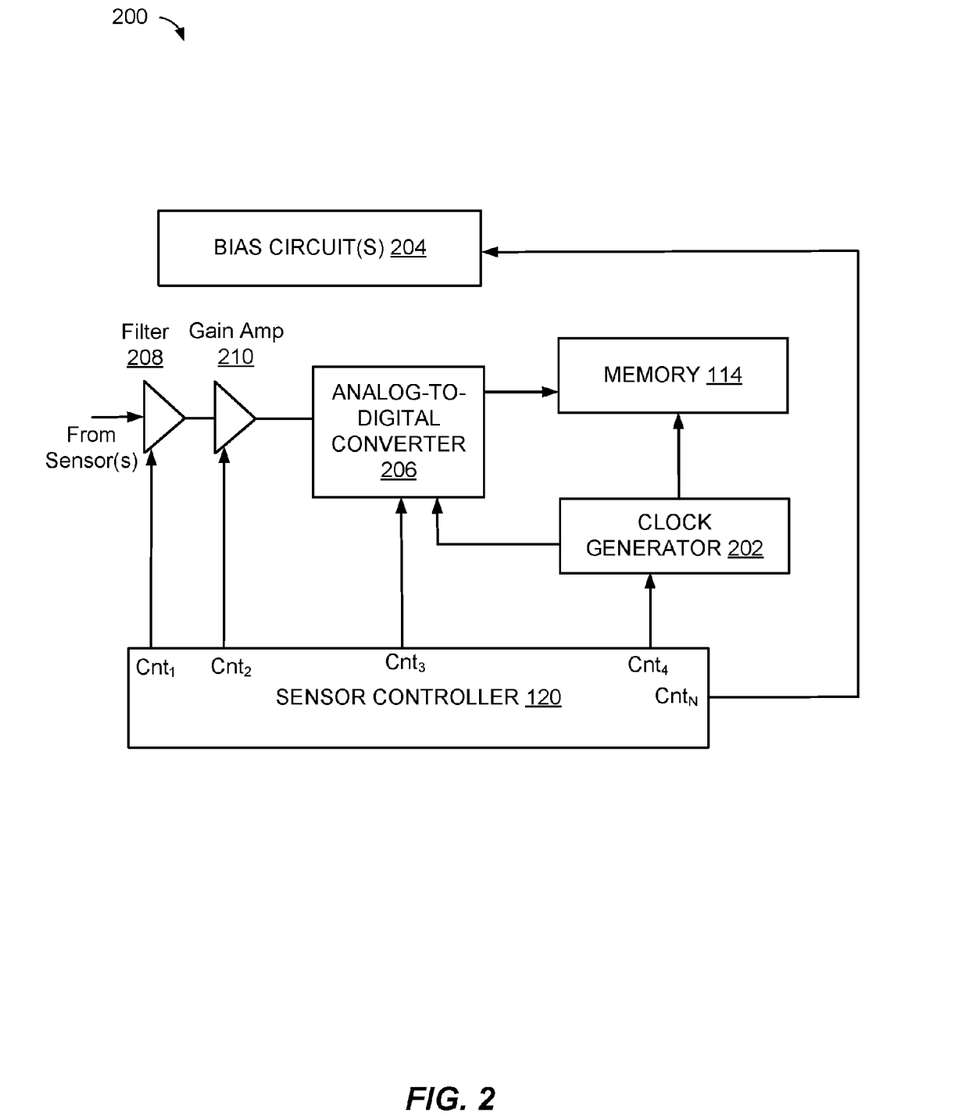
FIG. 2 is a conceptual diagram of a sensor controller in accordance with an aspect of the present disclosure.

FIG. 2 illustrates a conceptual diagram that illustrates an example circuit/component arrangement 200 for acquiring sensor data. The circuit/component arrangement 200 includes a sensor controller 120, a filter 208, a gain amplifier 210, an analog-to-digital converter 206, one or more bias circuits 204, a memory 114, and a clock generator 202. The sensor controller 120 may include one or more control outputs ("$Cnt_1$ to $Cnt_N$") for transmitting control signals to one or more components. For example, a respective control output may be coupled to the filter 208, the gain amplifier 210, the analog-to-digital converter 206, the clock generator 202, and/or the one or more bias circuits 204. In some aspects, the one or more bias circuits 204 may be associated with the one or more sensors of FIG. 1. That is, the one or more bias circuits 204 may, upon receiving an instruction from the sensor controller 120, activate the one or more selected sensors to capture data. The captured data from the one or more sensors may be provided to the filter 208 and the gain amplifier 210 to perform analog signal conditioning to improve signal quality. The captured data may then be provided to the analog-to-digital converter 206 to convert the analog captured data to digital data. The converted digital data may then be sent to the memory 114 for storage. In some aspects, the analog data may also be stored. Concurrently, clock generator 202 may provide a clock signal, at the direction of the sensor controller 120, to analog-to-digital converter 206 and the memory 114.

Further, in some aspects, the clock generator 202, the analog-to-digital converter 206, the filter 208, and/or the gain amplifier 210, may be on the same integrated die of a particular sensor (e.g., as listed in Table 1 above), or each component may be integrated on the same integrated die of the sensor controller 120, such that the bus may be an analog or digital bus depending on where the components are located.

Figure 3:
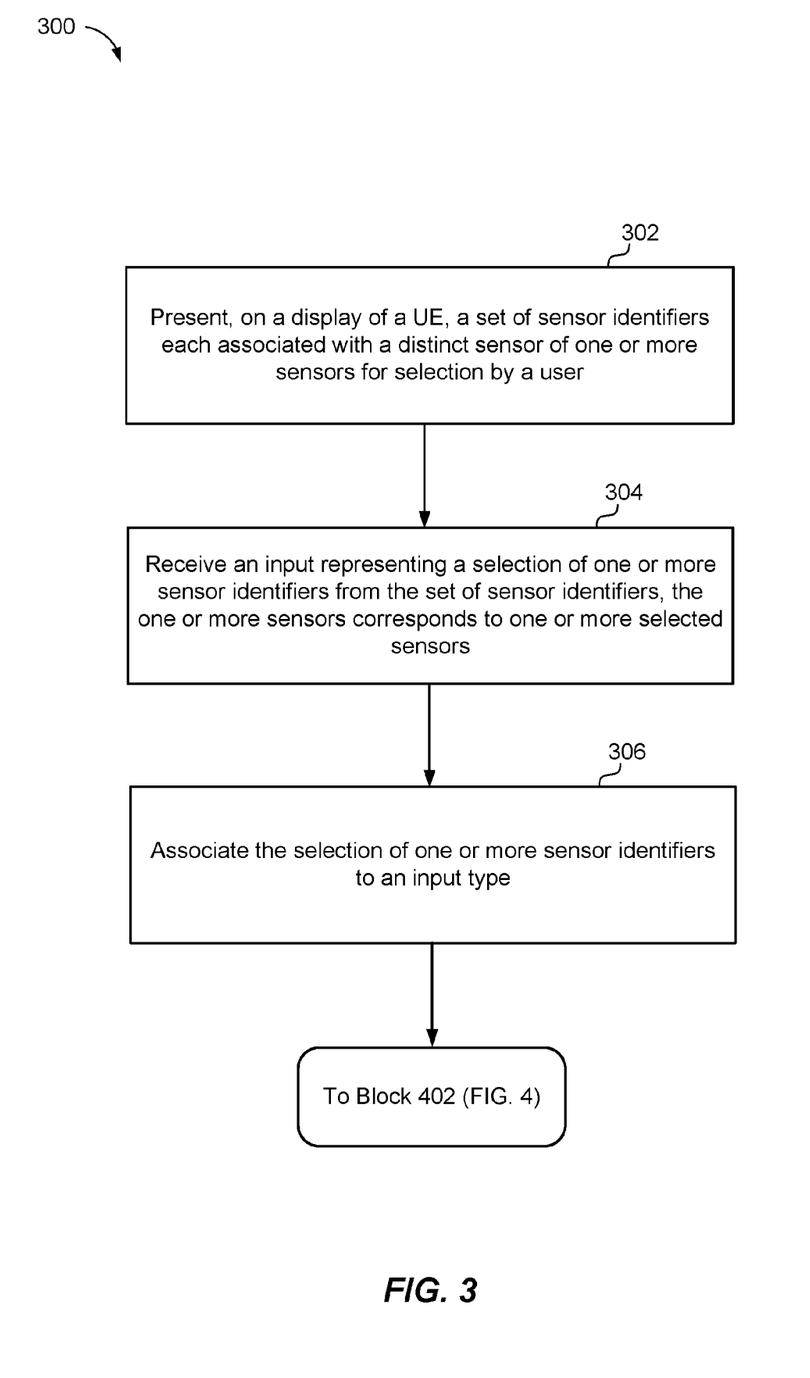
FIGS. 3-5 are flow diagrams illustrating an example method of acquiring sensor data in accordance with various aspect of the present disclosure.
Figure 4:
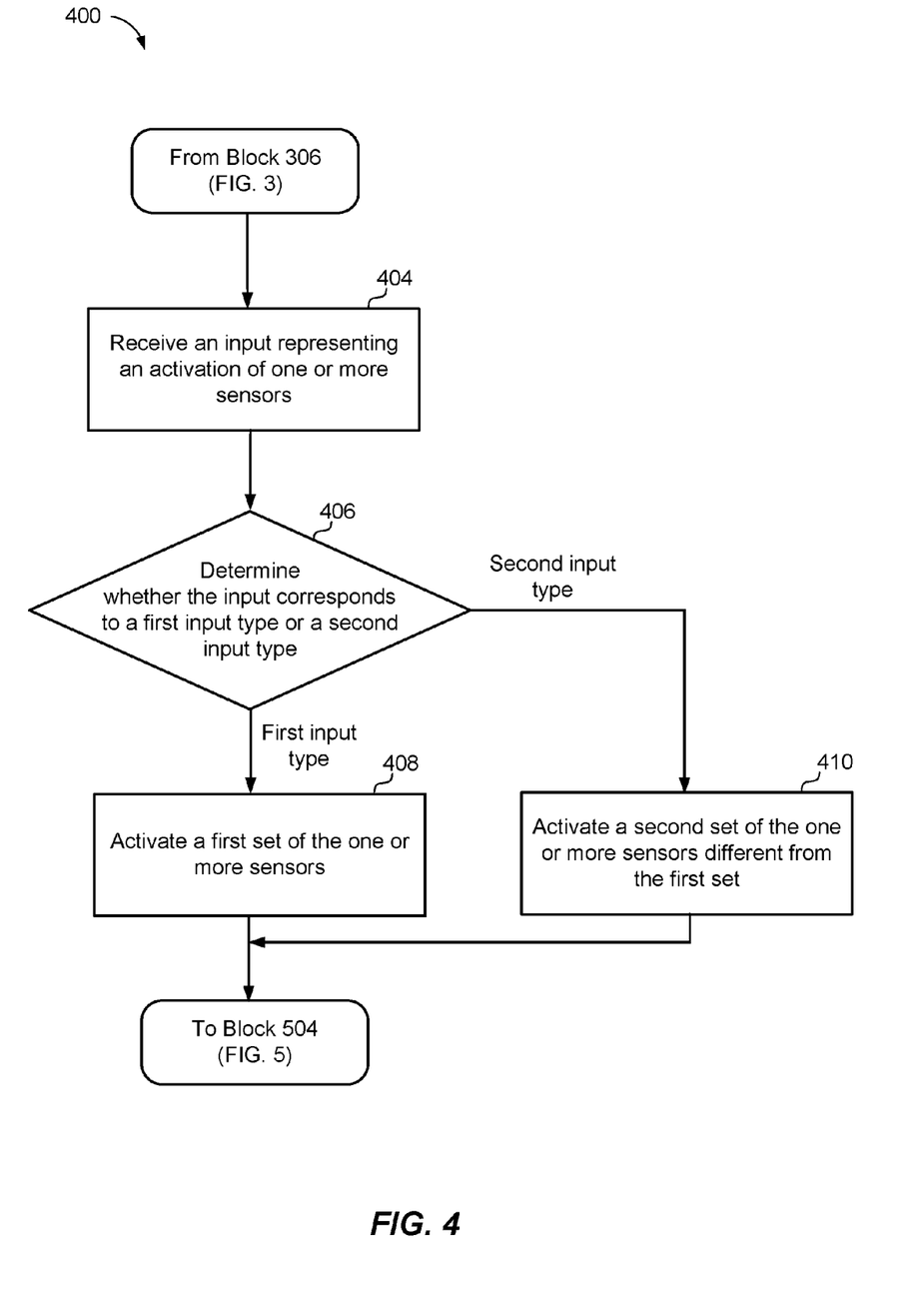
Figure 5:
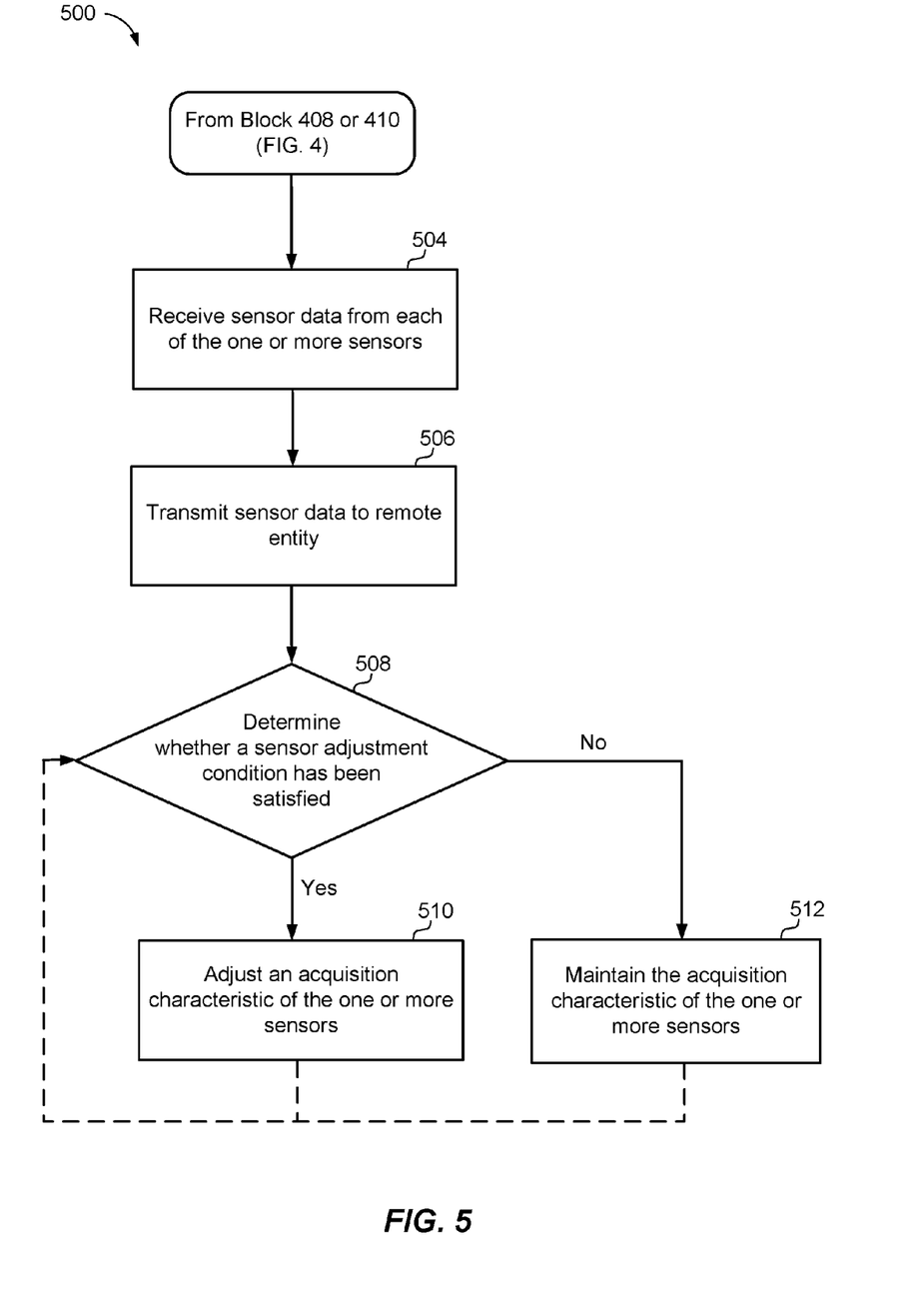

Referring to FIGS. 3-5, an example of one or more operations of an aspect of sensor controller 120 (FIG. 1) according to the present apparatuses and methods are described with reference to one or more methods and one or more components that manage activation and deactivation of one or more sensors and/or data capture components. Although the operations described below are presented in a particular order and/or as being performed by an example component, the ordering of the actions and the components performing the actions may be varied, depending on the implementation. Also, although sensor controller 120 (FIG. 1) is illustrated as having a number of subcomponents, it should be understood that one or more of the illustrated subcomponents may be separate from, but in communication with, sensor controller 120 (FIG. 1) and/or each other. Moreover, it should be understood that the following actions or components described with respect to sensor controller 120 (FIG. 1) and/or its subcomponents may be performed by a specially-programmed processor, a processor executing specially-programmed software or computer-readable media, or by any other combination of a hardware component and/or a software component specially configured for performing the described actions or components.

In an aspect, at 302, method 300 may present, on a display of a UE, a set of sensor identifiers each associated with a distinct sensor of one or more sensors for selection by a user. In an aspect, for example, UE 100 (FIG. 1) may execute user interface 130 (FIG. 1) to present, on a display 136 (FIG. 1) of a UE, a set of sensor identifiers, each sensor identifier associated with a distinct sensor of the one or more sensors that may be selected by a user.

At block 304, method 300 may receive an input representing a selection of one or more sensor identifiers from the set of sensor identifiers, the one or more sensors corresponds to one or more selected sensors. In an aspect, for example, sensor controller 120 (FIG. 1) may receive, from user interface 130 (FIG. 1), an input represent a selection of one or more sensor identifiers from the set of sensor identifiers, the one or more sensors corresponds to one or more selected sensors.

At block 306, method 300 may associate the selection of one or more sensor identifiers to an input type. In an aspect, for example, UE 100 (FIG. 1) may execute sensor controller 120 (FIG. 1) to associate the selection of one or more sensor identifiers to an input type.

Method 300 may proceed to block 404 of method 400 on FIG. 4.

At block 404, method 400 may receive an input representing an activation of one or more sensors. In an aspect, for example, sensor controller 120 (FIG. 1) may receive, from user interface 130 (FIG. 1), an input representing an activation of one or more sensors. In some aspects, the input corresponds to an input type, the input type determines which sensor(s) are to be activated.

Further, at block 406, method 400 may determine whether the input corresponds to a first input type or a second input type. In an aspect, for example, UE 100 (FIG. 1) may execute sensor controller 120 (FIG. 1) to determine whether the input received at block 404 corresponds to a first input type or a second input type.

Method 400 may proceed to block 408 based on determining that the input received at block 404 corresponds to the first input type. Specifically, at block 408, method 400 may activate a first set of the one or more sensors. In an aspect, for example, UE 100 (FIG. 1) may execute sensor controller 120 (FIG. 1) to activate a first set of the one or more sensors.

Otherwise, method 400 may proceed to block 410 based on determining that the input received at block 404 corresponds to the second input type. Specifically, at block 410, method 400 may activate a second set of the one or more sensors which may be different from the first set. In an aspect, for example, UE 100 (FIG. 1) may execute sensor controller 120 (FIG. 1) to activate a second set of the one or more sensors which may be different from the first set. In some aspects, activating the second set of the one or more sensors includes determining at least one hardware circuit associated with each of the second set of one or more sensors, and activating the at least one hardware circuit associated with each of the second set of one or more sensors.

Method 400 may proceed to block 504 of method 500 on FIG. 5.

At block 504, method 500 may receive sensor data from each of the one or more sensors. In an aspect, for example, UE 100 (FIG. 1) may execute the sensor controller 120 (FIG. 1) to receive sensor data 150 (FIG. 1) from each of one of the first number of the one or more sensors or the second number of the one or more sensors in response to receiving the corresponding input type.

At block 506, method 500 may transmit sensor data to a remote entity. For example, the sensor controller 120 (FIG. 1) may execute one or more of WWAN component 104 (FIG. 1), Bluetooth component 106 (FIG. 1), GPS component 108 (FIG. 1), and/or WLAN component 110 (FIG. 1) to transmit (e.g., on one or more communication channels) the sensor data 150 (FIG. 1) to a remote entity (e.g., a remote server device and/or another UE).

Further, at block 508, method 500 may determine whether a sensor adjustment condition has been satisfied. In an aspect, for example, the sensor controller 120 (FIG. 1) may execute the sensor adjustment determiner 122 (FIG. 1) to determine whether a sensor adjustment condition 124 (FIG. 1) has been satisfied. For example, the determination at block 508 may occur while receiving the sensor data from each of the one or more sensors and/or while transmitting the sensor data to the remote entity.

In some aspects, determining whether the sensor adjustment condition has been satisfied includes determining that a power supply of the UE satisfies (e.g., meets or falls below) a power supply threshold. In some aspects, determining whether the sensor adjustment condition has been satisfied includes determining that a storage capacity level of a storage device satisfies (e.g., meets or falls below) a storage capacity threshold. In some aspects, determining whether the sensor adjustment condition has been satisfied includes receiving an input (e.g., from user interface 130, FIG. 1) representing a deactivation of the one or more activated sensors. Further, in some aspects, determining whether the sensor adjustment condition has been satisfied includes determining that at least one channel condition of a channel on which the sensor data is transmitted satisfies a channel condition threshold.

Method 500 may proceed to block 510 based on determining that the sensor adjustment condition has been satisfied. In an aspect, for example, sensor controller 120 (FIG. 1) may execute adjustment component 126 (FIG. 1) to adjust an acquisition characteristic of the one or more activated sensors. In some aspects, adjusting the acquisition characteristic of the one or more sensors includes adjusting an output bit depth of an analog-to-digital converter based on determining that the power supply of the UE satisfies (e.g., meets or falls below) the power supply threshold. In some aspects, adjusting the acquisition characteristic of the one or more sensors includes deactivating at least a subset of the one or more sensors based on determining that the power supply of the UE satisfies (e.g., meets or falls below) the power supply threshold.

In some aspects, adjusting the acquisition characteristic of the one or more sensors includes adjusting at least one of a recording/acquisition interval (at memory 114, FIG. 1), a signal sampling rate (e.g., of microphone/speaker 132, FIG. 1), a data compression rate (e.g., of camera(s) 144, FIG. 1), and/or an image capture rate (e.g., of camera(s) 144, FIG. 1) based on determining that the storage capacity level of the storage device satisfies (e.g., meets or falls below) the storage capacity threshold. In some aspects, adjusting the acquisition characteristic of the one or more sensors includes deactivating at least a subset of the one or more sensors in response to receiving the input at block 504. In some aspects, the storage capacity threshold may be indicative of a remaining amount of storage capacity such that all sensor data rates may be scaled back by a factor or preconfigured amount to permit additional data from the one or more activated sensors to be acquired and stored. Further, in some aspects, adjusting the acquisition characteristic of the one or more sensors includes adjusting a transmission characteristic of the sensor data based on determining that the at least one channel condition satisfies the channel condition threshold.

Otherwise, method 500 may proceed to block 512 based on determining that the sensor adjustment condition has not been satisfied. Specifically, at block 510, method 500 may maintain the acquisition characteristic of the one or more sensors. In an aspect, for example, sensor controller 120 (FIG. 1) may forgo execution of adjustment component 126 (FIG. 1) to maintain the acquisition characteristic of the one or more sensors. In some aspects, method 500 may proceed or otherwise return to block 506 from blocks 508 and/or 510 on a periodic or user triggered basis (e.g., receiving an input from user interface 130, FIG. 1).

Figure 6:
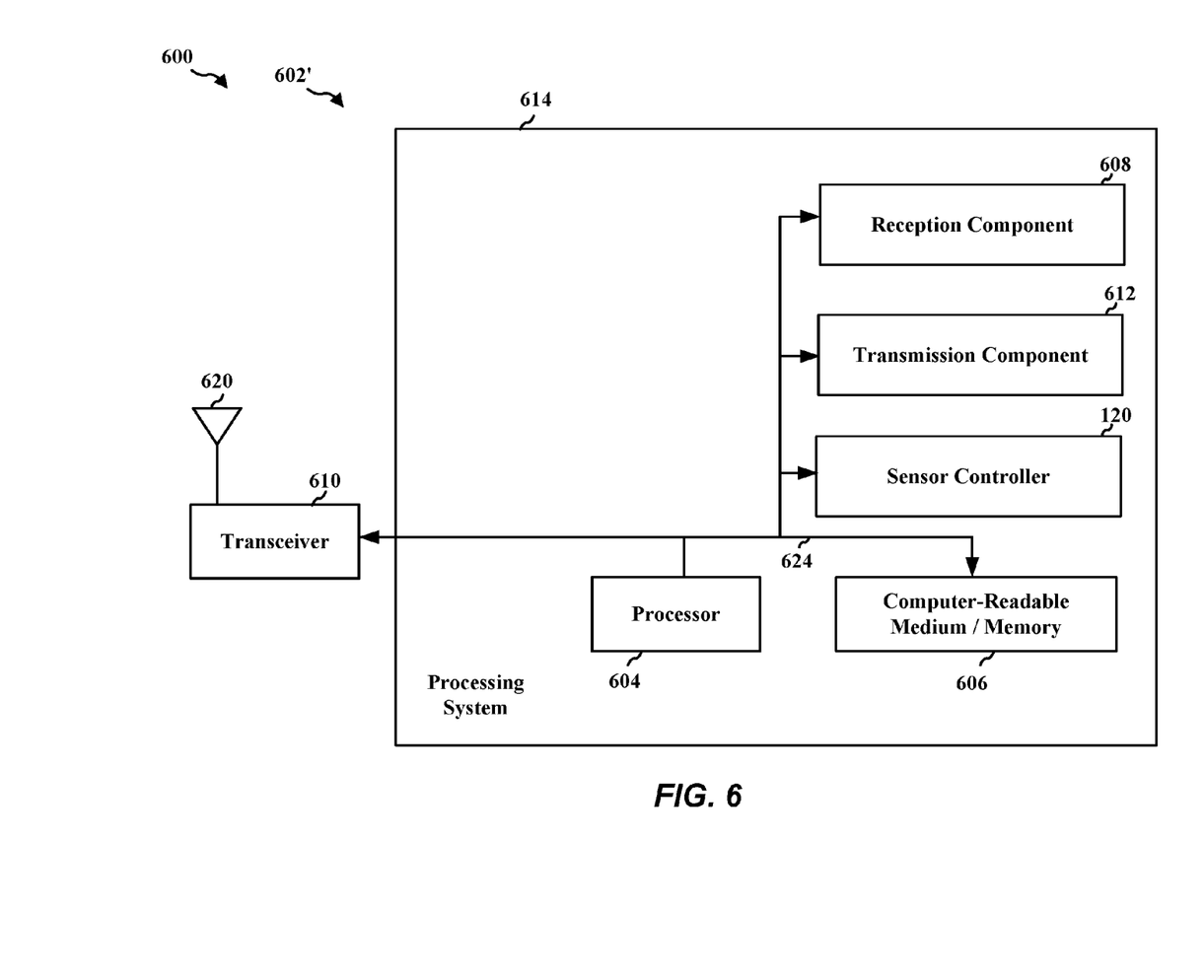
FIG. 6 is a diagram illustrating an example of a hardware implementation for an apparatus employing a processing system including a sensor controller in accordance with various aspects of the present disclosure.

FIG. 6 is a diagram 600 illustrating an example of a hardware implementation for an apparatus 602' employing a processing system 514 that includes sensor controller 120 (FIG. 1). The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 604, 608, 612, and 120, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 608. In addition, the transceiver 610 receives information from the processing system 614, specifically the transmission component 612, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The components may be software components running in the processor 604, resident/stored in the computer readable medium/memory 606, one or more hardware components coupled to the processor 604, or some combination thereof.

In one configuration, the apparatus 602/602' includes means for receiving a first input representing a request to activate one or more sensors. The apparatus 602/602' further includes means for activating, by a controller at the UE, the one or more sensors in response to receiving the first input. The apparatus 602/602' further includes means for receiving the sensor data from each of the one or more sensors in response to activating the one or more sensors. The apparatus 602/602' further includes means for determining whether a sensor adjustment condition has been satisfied. The apparatus 602/602' further includes means for adjusting an acquisition characteristic of the one or more sensors based on determining that the sensor adjustment condition has been satisfied. The aforementioned means may be one or more of the aforementioned components of the apparatus 602 and/or the processing system 614 of the apparatus 602' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of acquiring sensor data at a user equipment (UE), comprising:
    receiving a first input representing a request to activate one or more sensors;
    activating, by a controller at the UE, the one or more sensors in response to receiving the first input;
    receiving the sensor data from each of the one or more sensors in response to activating the one or more sensors;
    determining whether a sensor adjustment condition has been satisfied, wherein determining whether the sensor adjustment condition has been satisfied includes determining that a storage capacity level of a storage device satisfies a storage capacity threshold; and
    adjusting an acquisition characteristic of the one or more sensors based on determining that the sensor adjustment condition has been satisfied.

2. The method of claim 1, wherein determining whether the sensor adjustment condition has been satisfied further includes determining that a power supply of the UE satisfies a power supply threshold.

3. The method of claim 2, wherein adjusting the acquisition characteristic of the one or more sensors includes adjusting an output depth at an analog-to-digital converter based on determining that the power supply of the UE satisfies the power supply threshold.

4. The method of claim 2, wherein adjusting the acquisition characteristic of the one or more sensors includes deactivating at least a subset of the one or more sensors based on determining that the power supply of the UE satisfies the power supply threshold.

5. The method of claim 1, wherein adjusting the acquisition characteristic of the one or more sensors includes adjusting at least one of a recording interval of at least one of the one or more sensors, a sampling rate of at least one of the one or more sensors, or a compression rate of sensor data from at least one of the one or more sensors based on determining that the storage capacity level of the storage device satisfies the storage capacity threshold.

6. The method of claim 1, wherein determining whether the sensor adjustment condition has been satisfied further includes receiving a second input representing a deactivation of the one or more sensors.

7. The method of claim 6, wherein adjusting the acquisition characteristic of the one or more sensors includes deactivating at least a subset of the one or more sensors in response to receiving the second input.

8. The method of claim 1, further comprising transmitting the sensor data to a remote entity in response to receiving the sensor data from each of the one or more sensors.

9. The method of claim 8, wherein determining whether the sensor adjustment condition has been satisfied includes determining that at least one channel condition of a channel on which the sensor data is transmitted satisfies a channel condition threshold.

10. The method of claim 9, wherein adjusting the acquisition characteristic of the one or more sensors includes adjusting at least an acquisition rate of at least one of the one or more sensors or a sampling rate of at least one of the one or more sensors.

11. The method of claim 1, further comprising:
presenting, on a display of the UE, a set of sensor identifiers each associated with a distinct sensor of the one or more sensors for selection by a user; and
receiving a third input representing a selection of one or more sensor identifiers from the set of sensor identifiers, wherein the one or more sensors corresponds to one or more selected sensors.

12. The method of claim 1, further comprising determining whether the first input corresponds to a first input type or a second input type, wherein activating the one or more sensors includes activating a first number of the one or more sensors based on determining that the first input corresponds to the first input type or activating a second number of the one or more sensors different from the first number based on determining that the first input corresponds to the second input type.

13. The method of claim 1, wherein receiving sensor data from each of the one or more sensors includes:
receiving analog sensor data from each of the one or more sensors in response to activating the one or more sensors;
converting, at the controller, the analog data received from each of the one or more sensors to digital sensor data; and
transferring, from the controller to a storage device at the UE, the digital sensor data corresponding to each of the one or more sensors, wherein the transferring occurs periodically based on a defined time interval.

14. The method of claim 1, wherein activating the one or more sensors includes enabling a minimum subset of one or more circuits from a set of circuits used to acquire data corresponding to each of the one or more sensors.

15. The method of claim 1, wherein receiving the first input includes detecting a concurrent triggering of two or more buttons of the UE for a defined time period.

16. An apparatus for acquiring sensor data, comprising:
means for receiving a first input representing a request to activate one or more sensors;
means for activating, by a controller at a user equipment (UE), the one or more sensors in response to receiving the first input;
means for receiving the sensor data from each of the one or more sensors in response to activating the one or more sensors;
means for determining whether a sensor adjustment condition has been satisfied, wherein the means for determining whether the sensor adjustment condition has been satisfied is configured to determine that a storage capacity level of a storage device satisfies a storage capacity threshold; and
means for adjusting an acquisition characteristic of the one or more sensors based on determining that the sensor adjustment condition has been satisfied.

17. The apparatus of claim 16, wherein the means for determining whether the sensor adjustment condition has been satisfied is further configured to determine whether a power supply of the UE satisfies a power supply threshold.

18. The apparatus of claim 17, wherein the means for adjusting the acquisition characteristic of the one or more sensors is configured to adjust an output depth at an analog-to-digital converter based on determining that the power supply of the UE satisfies the power supply threshold.

19. The apparatus of claim 17, wherein the means for adjusting the acquisition characteristic of the one or more sensors is configured to deactivate at least a subset of the one or more sensors based on determining that the power supply of the UE satisfies the power supply threshold.

20. The apparatus of claim 1, wherein the means for adjusting the acquisition characteristic of the one or more sensors is configured to adjust at least one of a recording interval of at least one of the one or more sensors, a sampling rate of at least one of the one or more sensors, or a compression rate of sensor data from at least one of the one or more sensors based on determining that the storage capacity level of the storage device satisfies the storage capacity threshold.

21. The apparatus of claim 16, wherein the means for determining whether the sensor adjustment condition has been satisfied is further configured to receive a second input representing a deactivation of the one or more sensors.

22. The apparatus of claim 21, wherein the means for adjusting the acquisition characteristic of the one or more sensors is configured to deactivate at least a subset of the one or more sensors in response to receiving the second input.

23. The apparatus of claim 16, further comprising means for transmitting the sensor data to a remote entity in response to receiving the sensor data from each of the one or more sensors.

24. The apparatus of claim 23, wherein the means for determining whether the sensor adjustment condition has been satisfied is configured to determine that at least one channel condition of a channel on which the sensor data is transmitted satisfies a channel condition threshold.

25. The apparatus of claim 24 wherein the means for adjusting the acquisition characteristic of the one or more sensors is configured to adjust at least an acquisition rate of at least one of the one or more sensors or a sampling rate of at least one of the one or more sensors.

26. A non-transitory computer-readable medium storing computer executable code, comprising code to:
receive a first input representing a request to activate one or more sensors;
activate, by a controller at a user equipment (UE), the one or more sensors in response to the reception of the first input;
receive sensor data from each of the one or more sensors in response to the activation of the one or more sensors;
determine whether a sensor adjustment condition has been satisfied, wherein the determination whether the sensor adjustment condition has been satisfied comprises to determine that a storage capacity level of a storage device satisfies a storage capacity threshold; and
adjust an acquisition characteristic of the one or more sensors based on the determination that the sensor adjustment condition has been satisfied.

27. The non-transitory computer-readable medium of claim 26, wherein the determination whether the sensor adjustment condition has been satisfied further comprises to determine that a power supply of the UE satisfies a power supply threshold.

28. The non-transitory computer-readable medium of claim 27, wherein the adjustment of the acquisition characteristic of the one or more sensors comprises to adjust an output depth at an analog-to-digital converter based on the determination that the power supply of the UE satisfies the power supply threshold.

29. The non-transitory computer-readable medium of claim 27, wherein the adjustment of the acquisition characteristic of the one or more sensors comprises to deactivate at least a subset of the one or more sensors based on the determination that the power supply of the UE satisfies the power supply threshold.

30. The non-transitory computer-readable medium of claim 26, wherein the adjustment of the acquisition characteristic of the one or more sensors comprises to adjust at least one of a recording interval, a sampling rate, or a compression rate based on the determination that the storage capacity level of the storage device satisfies the storage capacity threshold.

31. The non-transitory computer-readable medium of claim 26, wherein the determination whether the sensor adjustment condition has been satisfied further comprises to receive a second input representing a deactivation of the one or more sensors.

32. The non-transitory computer-readable medium of claim 26, further comprising code to transmit the sensor data to a remote entity in response to the reception of the sensor data from each of the one or more sensors.

33. The non-transitory computer-readable medium of claim 32, wherein the determination whether the sensor adjustment condition has been satisfied comprises to determine that at least one channel condition of a channel on which the sensor data is transmitted satisfies a channel condition threshold.

34. The non-transitory computer-readable medium of claim 33, wherein the adjustment of the acquisition characteristic of the one or more sensors comprises to adjust at least an acquisition rate of at least one of the one or more sensors or a sampling rate of at least one of the one or more sensors.

35. An apparatus for acquiring sensor data, comprising:
a memory; and
at least one processor coupled to the memory and configured to:
receive a first input representing a request to activate one or more sensors;
activate, by a controller at a user equipment (UE), the one or more sensors in response to receiving the first input;
receive the sensor data from each of the one or more sensors in response to activating the one or more sensors;
determine whether a sensor adjustment condition has been satisfied, wherein to determine whether the sensor adjustment condition has been satisfied, the at least one processor is further configured to determine that a storage capacity level of a storage device satisfies a storage capacity threshold; and
adjust an acquisition characteristic of the one or more sensors based on determining that the sensor adjustment condition has been satisfied.

36. The apparatus of claim 35, wherein to determine whether the sensor adjustment condition has been satisfied, the at least one processor is further configured to determine that a power supply of the UE satisfies a power supply threshold.

37. The apparatus of claim 36, wherein to adjust the acquisition characteristic of the one or more sensors, the at least one processor is further configured to adjust an output depth at an analog-to-digital converter based on determining that the power supply of the UE satisfies the power supply threshold.

38. The apparatus of claim 36, wherein to adjust the acquisition characteristic of the one or more sensors, the at least one processor is further configured to deactivate at least a subset of the one or more sensors based on determining that the power supply of the UE satisfies the power supply threshold.

39. The apparatus of claim 35, wherein to adjust the acquisition characteristic of the one or more sensors, the at least one processor is further configured to adjust at least one of a recording interval, a sampling rate, or a compression rate based on determining that the storage capacity level of the storage device satisfies the storage capacity threshold.

40. The apparatus of claim 35, wherein to determine whether the sensor adjustment condition has been satisfied, the at least one processor is further configured to receive a second input representing a deactivation of the one or more sensors.

41. The apparatus of claim 40, wherein to adjust the acquisition characteristic of the one or more sensors, the at least one processor is further configured to deactivate at least a subset of the one or more sensors in response to receiving the second input.

42. The apparatus of claim 35, wherein the at least one processor is further configured to transmit the sensor data to a remote entity in response to receiving the sensor data from each of the one or more sensors.

43. The apparatus of claim 42, wherein to determine whether the sensor adjustment condition has been satisfied, the at least one processor is further configured to determine that at least one channel condition of a channel on which the sensor data is transmitted satisfies a channel condition threshold.

44. The apparatus of claim 43, wherein to adjust the acquisition characteristic of the one or more sensors, the at least one processor is further configured to adjust at least an acquisition rate of at least one of the one or more sensors or a sampling rate of at least one of the one or more sensors.

45. The apparatus of claim 35, wherein the at least one processor is further configured to:
present, on a display of the UE, a set of sensor identifiers each associated with a distinct sensor of the one or more sensors for selection by a user; and
receive a third input representing a selection of one or more sensor identifiers from the set of sensor identifiers, wherein the one or more sensors corresponds to one or more selected sensors.

46. The apparatus of claim 35, wherein the at least one processor is further configured to determine whether the first input corresponds to a first input type or a second input type, wherein to activate the one or more sensors, wherein the at least one processor is further configured to activate a first number of the one or more sensors based on determining that the first input corresponds to the first input type or activate a second number of the one or more sensors different from the first number based on determining that the first input corresponds to the second input type.

47. The apparatus of claim 35, wherein to receive sensor data from each of the one or more sensors, the at least one processor is further configured to:
receive analog sensor data from each of the one or more sensors in response to activating the one or more sensors;
convert, at the controller, the analog data received from each of the one or more sensors to digital sensor data; and
transfer, from the controller to a storage device at the UE, the digital sensor data corresponding to each of the one or more sensors, wherein the transferring occurs periodically based on a defined time interval.

48. The apparatus of claim 35, wherein to activate the one or more sensors, the at least one processor is further configured to enable a minimum subset of one or more circuits from a set of circuits used to acquire data corresponding to each of the one or more sensors.

49. The apparatus of claim 35, wherein to receive the first input, the at least one processor is further configured to detect a concurrent triggering of two or more buttons of the UE for a defined time period.

50. A method of acquiring sensor data at a user equipment (UE), comprising:
receiving a first input representing a request to activate one or more sensors;
activating, by a controller at the UE, the one or more sensors in response to receiving the first input;
receiving the sensor data from each of the one or more sensors in response to activating the one or more sensors;
transmitting the sensor data to a remote entity in response to receiving the sensor data from each of the one or more sensors;
determining whether a sensor adjustment condition has been satisfied, wherein determining whether the sensor adjustment condition has been satisfied includes determining that at least one channel condition of a channel on which the sensor data is transmitted satisfies a channel condition threshold; and
adjusting an acquisition characteristic of the one or more sensors based on determining that the sensor adjustment condition has been satisfied.

51. The method of claim 50, wherein determining whether the sensor adjustment condition has been satisfied further includes receiving a second input representing a deactivation of the one or more sensors.

52. The method of claim 51, wherein adjusting the acquisition characteristic of the one or more sensors includes deactivating at least a subset of the one or more sensors in response to receiving the second input.

53. The method of claim 50, wherein adjusting the acquisition characteristic of the one or more sensors includes adjusting at least an acquisition rate of at least one of the one or more sensors or a sampling rate of at least one of the one or more sensors.

54. The method of claim 50, further comprising:
presenting, on a display of the UE, a set of sensor identifiers each associated with a distinct sensor of the one or more sensors for selection by a user; and
receiving a third input representing a selection of one or more sensor identifiers from the set of sensor identifiers, wherein the one or more sensors corresponds to one or more selected sensors.

55. The method of claim 50, further comprising determining whether the first input corresponds to a first input type or a second input type, wherein activating the one or more sensors includes activating a first number of the one or more sensors based on determining that the first input corresponds to the first input type or activating a second number of the one or more sensors different from the first number based on determining that the first input corresponds to the second input type.

56. The method of claim 50, wherein receiving sensor data from each of the one or more sensors includes:
receiving analog sensor data from each of the one or more sensors in response to activating the one or more sensors;
converting, at the controller, the analog data received from each of the one or more sensors to digital sensor data; and
transferring, from the controller to a storage device at the UE, the digital sensor data corresponding to each of the one or more sensors, wherein the transferring occurs periodically based on a defined time interval.

57. The method of claim 50, wherein activating the one or more sensors includes enabling a minimum subset of one or more circuits from a set of circuits used to acquire data corresponding to each of the one or more sensors.

58. The method of claim 50, wherein receiving the first input includes detecting a concurrent triggering of two or more buttons of the UE for a defined time period.

* * * * *